H. A. NAYLOR.
ADJUSTABLE FLY WHEEL.
APPLICATION FILED JUNE 22, 1916.
1,204,180.  Patented Nov. 7, 1916.
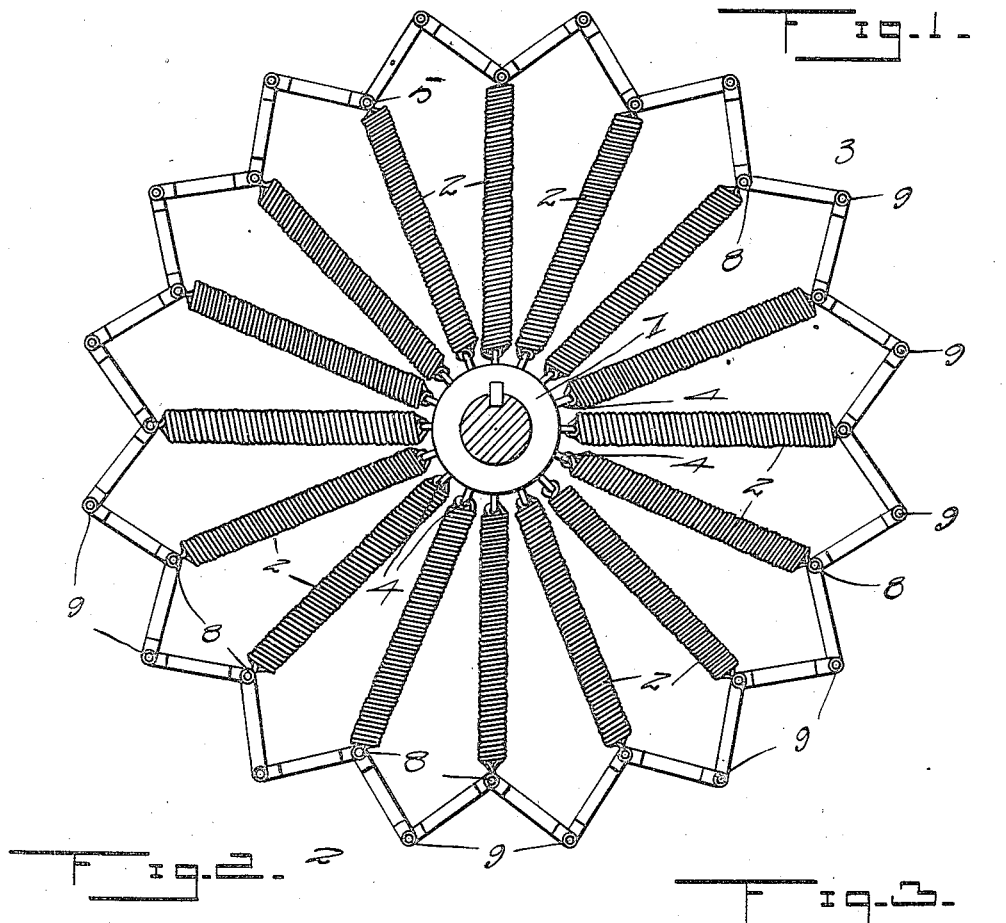
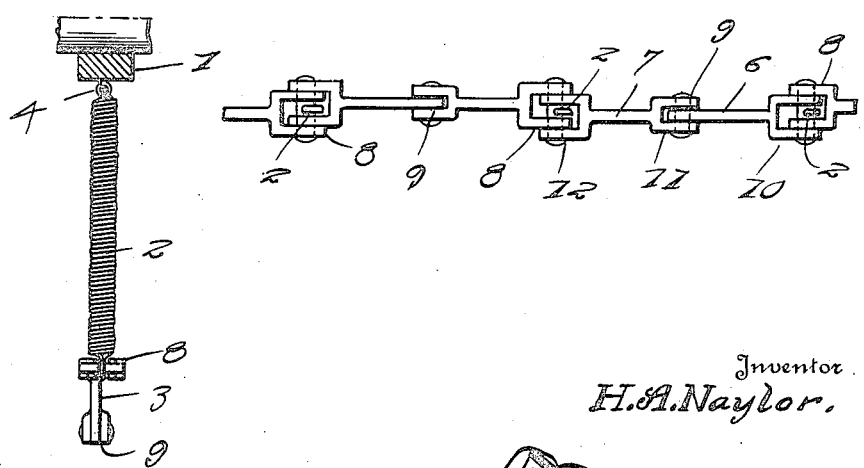
Witnesses
Inventor
H. A. Naylor.
By Attorney

UNITED STATES PATENT OFFICE.

HENRY A. NAYLOR, OF VALPARAISO, CHILE.

ADJUSTABLE FLY-WHEEL.

1,204,180.　　　　　　　　Specification of Letters Patent.　　　Patented Nov. 7, 1916.

Application filed June 22, 1916.　Serial No. 105,186.

*To all whom it may concern:*

Be it known that I, HENRY A. NAYLOR, a subject of the King of England, residing at Valparaiso, in Chile, South America, have invented certain new and useful Improvements in Adjustable Fly-Wheels; and I do hereby declare the following to be a full, clear, and exact description of the invention, such as will enable others skilled in the art to which it appertains to make and use the same.

The invention relates to improvements in fly wheels.

The object of the present invention is to improve the construction of fly wheels and to provide a simple, practical and efficient fly wheel capable of adjustment and adapted to be acted on by centrifugal force to cause it to increase its size with the velocity of the machine to which it is attached maintaining at the same time a perfect equilibrium and stability of motion.

With these and other objects in view, the invention consists in the construction and novel combination of parts hereinafter fully described, illustrated in the accompanying drawing and pointed out in the claims hereto appended; it being understood that various changes in the form, proportion, size and minor details of construction, within the scope of the claims, may be resorted to without departing from the spirit or sacrificing any of the advantages of the invention.

In the drawings Figure 1 is a side elevation of an adjustable fly wheel constructed in accordance with this invention, Fig. 2 is a sectional view of the same, Fig. 3 is a plan view of the rim of the fly wheel.

Like numerals of reference designate corresponding parts in the several figures of the drawing.

In the accompanying drawing in which is illustrated the preferred embodiment of the invention, the adjustable fly wheel comprises in its construction a hub 1, radial spokes 2 and a rim 3. The hub 1 which may be of any desired construction is designed to be mounted on a shaft and keyed or otherwise fixed to the same. The radial spokes which consist of extensible coiled springs are secured at their inner ends 4 to the hub and they are connected at their outer ends 5 to the rim of the fly wheel. Any suitable means may be employed for securing the inner ends of the spokes to the hub of the fly wheel and the spokes are constructed of suitable resilient material and of a size and strength to correspond with the size of the fly wheel and the weight of the material involved in the construction of the same.

The rim of the wheel is composed of a plurality of links 6 and 7 arranged at an angle to one another and connected at their adjacent ends by inner and outer pivots 8 and 9, the inner pivots preferably constituting the means for connecting the outer ends 5 of the radially arranged coiled springs or spokes to the rim. The link 6 is provided at one end with a forked or bifurcated head 10 and its other end is connected to the adjacent link which is provided at its ends with forked or bifurcated heads or portions 11 and 12. The head or portion 11 which is smaller than the head or portion 12 receives the adjacent end of the link 6 while the head or portion 12 interfits with the head 10 of the link 6 as clearly illustrated in Fig. 3 of the drawing. Various other means may, however, be employed for connecting the links with one another and it will be apparent that when the wheel increases in speed of rotation, the rim and the spokes will be moved outwardly through centrifugal force and the coiled springs which are normally closed will open and will present a greater area to the air. The angularly related links of the rim of the fly wheel alternately extend inwardly and outwardly forming a substantially zigzag arranged rim and the pivotal movement of the links on one another will permit the fly wheel to expand and move outwardly as it increases in speed. The outward movement of the rim and the extension of the coiled springs are simultaneous and they move inward simultaneously when the speed of the fly wheel decreases.

What is claimed is:—

1. An adjustable fly wheel including an adjustable extensible rim, a hub and extensible springs connecting the rim with the hub, said springs and rim being adapted to move outwardly under the influence of centrifugal force when the speed of the fly wheel increases and to move inwardly when the speed decreases.

2. An adjustable fly wheel of the class described including radially arranged spokes consisting of extensible coiled springs and an adjustable rim connected with the spokes, said rim being extensible and adapted to move outwardly with the coiled springs as the speed of the fly wheel increases.

3. An adjustable fly wheel of the class described including a rim composed of zigzag arranged pivotally connected links alternately extended inwardly and outwardly and forming an extensible rim and springs connected with the inner angles of the links and adapted to move outwardly with the rim.

4. An adjustable fly wheel of the class described including a hub, a rim consisting of zigzag arranged pivotally connected links alternately extending inwardly and outwardly, and forming an extensible rim, a hub and radially arranged coiled springs secured at their inner ends to the hub and at their outer ends to the links of the rim at the inner angles of the said links.

In testimony whereof I affix my signature in presence of two witnesses.

HENRY A. NAYLOR.

Witnesses:
M. I. LEWIS,
BENNETT S. JONES.